Sept. 2, 1924.

H. V. LOUGH 1,507,240

TIRE TREATING APPARATUS

Filed May 29, 1923

Inventor
HECTOR V. LOUGH

By his Attorney

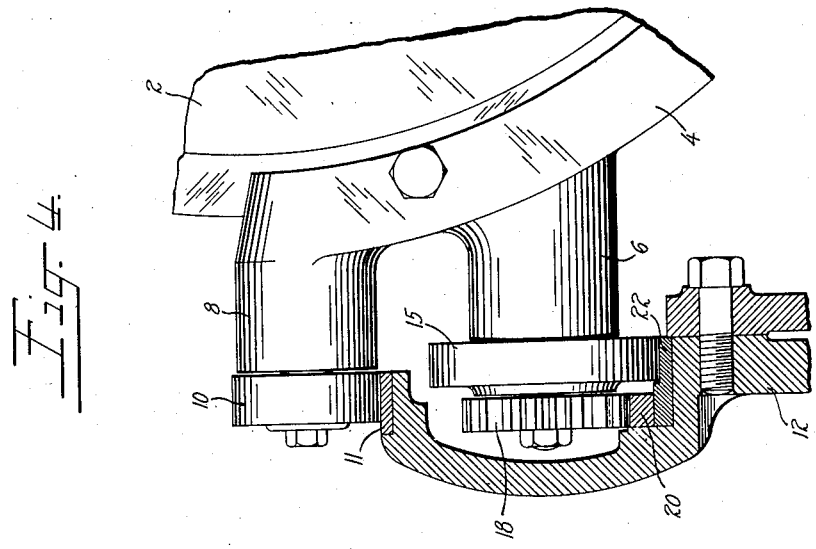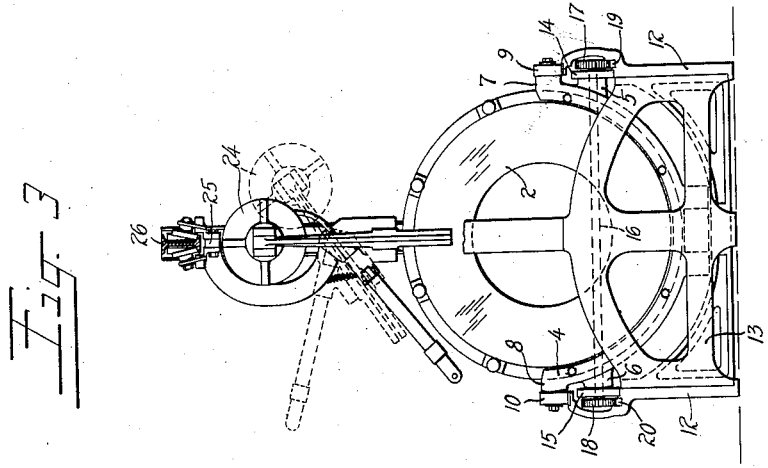

Patented Sept. 2, 1924.

1,507,240

UNITED STATES PATENT OFFICE.

HECTOR V. LOUGH, OF HARTFORD, CONNECTICUT, ASSIGNOR TO THE HARTFORD RUBBER WORKS COMPANY, OF HARTFORD, CONNECTICUT, A CORPORATION OF CONNECTICUT.

TIRE-TREATING APPARATUS.

Application filed May 29, 1923. Serial No. 642,269.

*To all whom it may concern:*

Be it known that I, HECTOR V. LOUGH, a subject of the King of England, residing at Hartford, county of Hartford, and State of Connecticut, have invented a certain new and useful Tire-Treating Apparatus, of which the following is a full, clear, and exact description.

This invention relates to the manufacture of tires and, more particularly, an apparatus for facilitating a treatment of the casings sometimes desirable in their manufacture.

In connection with what is known as the "pulley-band" process of manufacture—in which the casings are built flat on a drum and then roughly brought to tire form by pressing their beads together while simultaneously bulging out the central portion of the band—it has been found desirable, before curing the casings, to subject them to a "setting treatment." The casings are confined in sectional molds, much like those used in finally vulcanizing them, and a fluid pressure of around 200 pounds applied (usually through a rubber bag resembling an inner tube) to the inner walls of the casing, the sections of the mold being suitably held together, by clamps for instance.

The present invention aims to provide a simple and easily manipulated apparatus for introducing and removing the casings incident to the above-mentioned "set treatment," in which, ordinarily, no heat is employed. Various advantages of the invention will be apparent from the detailed description hereinafter given.

With the illustrated embodiment in mind and without intention to limit more than is required by the prior art, the invention consists, briefly, in supporting the shaping molds—as they are called—so that they may be opened book-fashion without arduous labor and with a rapidity meeting economic requirements.

A preferred embodiment of the invention is illustrated in the accompanying drawings in which:—

Figure 3 is an end elevation of the same;

Figure 1:
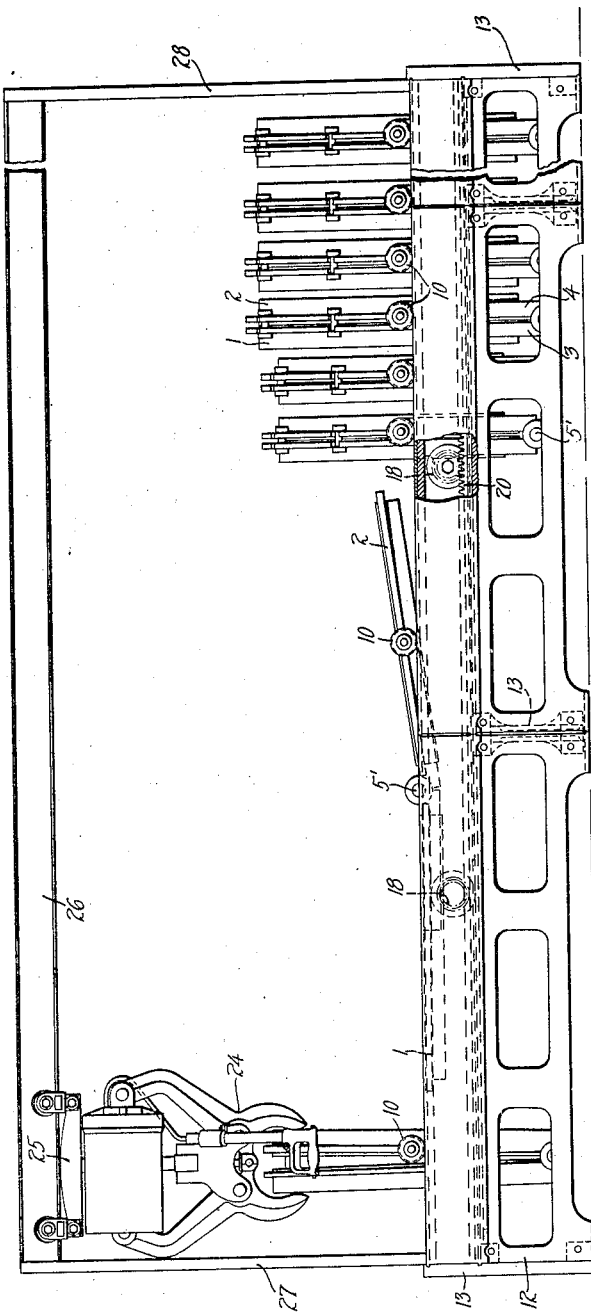
Figures 1 and 2 are elevation and plan views, respectively, of the apparatus locally sectioned to disclose details of the construction.
Figure 2:
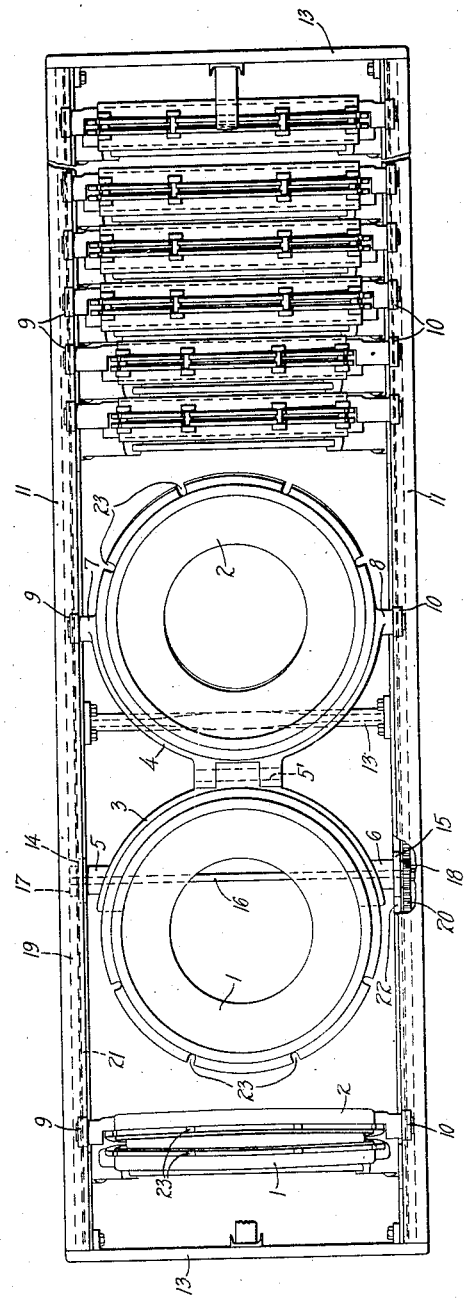

And Figure 4 is an enlarged detail, partly in section, illustrating guideways, supporting rollers, and a rack, constituting portions of the preferred apparatus.

According to the invention, one or more molds, each having a pair of sections 1 and 2, are secured by brazing or bolting to cradles 3 and 4, which are hinged together, as at 5', to insure the sections of the mold registering when closed together and also to enable the two sections of each mold to be manipulated rapidly and as a unit. Each of the cradles 3 and 4 is provided with a pair of lugs 5—6 and 7—8, these lugs being preferably located, as shown, at or approaching a diameter through the mold sections which is parallel to the hinge-pin 5', and desirably dividing the weight of the mold sections so as to facilitate the swinging of each as the sections are spread apart. The lugs 7—8 are each equipped with rollers 9 and 10, respectively, which rest upon a pair of upper guideways 11, which are fashioned on the parallel sides of a frame, indicated generally by the numeral 12. The frame 12 may be of any suitable construction but is preferably braced by stays 13, at intervals, which maintain it rigid and the guideways 11 parallel to one another.

The lugs 5—6 also are each equipped with rollers 14 and 15, respectively, preferably having roller-bearings (not shown). Through the lugs 5—6 and the rollers 14 and 15, is loosely passed a shaft 16, to the opposite ends of which are keyed pinions 17 and 18, which each engage with racks 19 and 20, respectively. The racks 19 and 20 are preferably located, as shown, adjacent the lower guideways 21 and 22, both the racks and the guideways being attached to or fashioned in the aforementioned frame 12.

While any suitable means may be used to close the sections of the mold to permit bolts to be slipped into various slots 23, it is preferred to employ a grappling device, indicated generally by the numeral 24, which is constructed as fully disclosed in my co-pending application Serial No. 642,270, filed May 29th, 1923, this grappling device being supported on a carriage 25, which tracks an I-beam, or other suitable lengthwise extending support, 26, sustained in spaced relation and preferably parallel to the guideways 11 by standards 27 and 28 secured to the opposite ends of the frame 12.

The invention is not intended to be limited to details of the construction disclosed and reference should be made to the appended claims for an understanding of its scope.

Having thus described my invention, what I claim and desire to protect by Letters Patent is:—

1. An apparatus for treating tires comprising, in combination, a plurality of molds each consisting of a pair of sections hinged together, and means for supporting the sections of said molds permitting them to be shifted and opened book fashion each mold independently of the others.

2. An apparatus for treating tires comprising, in combination, a plurality of hinged sectional molds, means for supporting the sections of said hinged molds permitting them to be opened book-fashion, said means including rollers sustaining the respective mold sections at opposite sides of each, and runways for said rollers.

3. An apparatus for treating tires comprising, in combination, a plurality of hinged sectional molds, means for supporting the sections of said hinged molds permitting them to be opened book-fashion, said means including rollers connected to the respective mold sections at opposite sides of each, runways on which said rollers rest, and means insuring equal translatory movement of the axes of the rollers on each of the mold sections.

4. An apparatus for treating tires comprising, in combination, a plurality of molds having sections, hinged cradles secured to each of said mold sections, pairs of rollers secured to said cradles with their axes parallel to that of the hinge, the rollers of each pair being located a greater distance apart than the diameter of the mold sections, two pairs of runways at different elevations on which said rollers rest, a pair of racks located adjacent and parallel to one of the pairs of runways, and a shaft secured to one of the cradle sections having pinions fixed to its opposite ends for engagement with said racks.

5. An apparatus for treating tires comprising, in combination, a plurality of hinged sectional molds, means for supporting the sections of said hinged molds permitting them to be opened book-fashion, said means including rollers sustaining the respective mold sections at opposite sides of each, runways for said rollers, and means shiftably supported above said molds and movable lengthwise of said runways for clamping the molds together at a point substantially opposite their hinged connection.

Signed at Hartford, county of Hartford, and State of Connecticut, this 26th day of May, 1923.

HECTOR V. LOUGH.